United States Patent [19]

Peaslee et al.

[11] Patent Number: 5,276,798
[45] Date of Patent: Jan. 4, 1994

[54] MULTIFUNCTION HIGH PERFORMANCE GRAPHICS RENDERING PROCESSOR

[75] Inventors: John M. Peaslee; Jeffrey C. Malacarne, both of Chino Hills, Calif.

[73] Assignee: Hughes Aircraft Company, Los Angeles, Calif.

[21] Appl. No.: 582,697

[22] Filed: Sep. 14, 1990

[51] Int. Cl.$^5$ .............................................. G06F 15/20
[52] U.S. Cl. .................................. 395/162; 395/130; 395/134; 395/164
[58] Field of Search ............... 395/100, 126, 129, 130, 395/133, 134, 162–164; 340/799, 703; 370/105.1, 395/158

[56] References Cited

U.S. PATENT DOCUMENTS

| | | | |
|---|---|---|---|
| 4,680,754 | 7/1987 | Fechalos | 370/105.1 |
| 4,700,320 | 10/1987 | Kapur | 395/158 |
| 4,858,107 | 8/1989 | Fedele | 395/164 |
| 4,862,392 | 8/1989 | Steiner | 395/164 |
| 4,885,703 | 12/1989 | Deering | 395/134 |
| 4,894,653 | 1/1990 | Frankenbach | 340/799 |
| 4,949,280 | 8/1990 | Littlefield | 395/163 |
| 4,958,303 | 9/1990 | Assarpour et al. | 395/164 |
| 4,984,183 | 1/1991 | Ohuchi | 395/134 |
| 5,003,496 | 3/1991 | Hunt, Jr. et al. | 395/130 |
| 5,027,291 | 6/1991 | Callahan et al. | 395/133 |
| 5,040,130 | 8/1991 | Chang et al. | 395/134 |
| 5,053,759 | 10/1991 | Sato | 395/133 |

*Primary Examiner*—Dale M. Shaw
*Assistant Examiner*—Kee M. Tung
*Attorney, Agent, or Firm*—W. K. Denson-Low

[57] ABSTRACT

Disclosed is a multifunction cogenerator or graphics processor for use in a graphics rendering processor. The graphics processor comprises dual graphics engines operating in parallel, with one of the engines having higher operating priority than the other. The graphics processor comprises a conics, vector, and area fill generator, a symbol generator, a bit block transfer operator, and a block texturing and complex clip mask processor synchronously controlled by a multiprocess scheduler. Included in the graphics processor is a large display memory for receiving and storing program instructions and data generated by an external host processor, internal generators and processors, and a bit mapped memory of a graphics display. The graphics processor provides hardware specific graphics functions and externally programmable general purpose processing.

7 Claims, 13 Drawing Sheets

MULTIFUNCTION HIGH PERFORMANCE GRAPHICS RENDERING PROCESSOR

CROSS REFERENCE TO RELATED APPLICATIONS

The present application is related to contemporaneously filed patent applications: Ser. No. 07/582,696, filed on Sep. 14, 1990, entitled, "Dual Programmable Block Texturing and Complex Clipping and Graphics Rendering Processor," Ser. No. 07/582,709, filed on Sep. 14, 1990, entitled "Dual Hardware Channels and Hardware Context Switching in a Graphics Rendering Processor," Ser. No. 07/582,710, filed on Sep. 14, 1990, entitled "Concurrent General Purpose and DMA Processing in a Graphics Rendering Processor," Ser. No. 07/582,728, filed on Sep. 14, 1990, entitled "Integrated Hardware Generator for Area Fill, Conics and Vectors in a Graphics Processor", Ser. No. 07/582,694, filed on Sep. 14, 1990, now U.S. Pat. No. 5,218,674, entitled "Hardware Bit Block Transfer Operator in a Graphics Rendering Processor," Ser. No. 07/582,693, filed on Sep. 14, 1990, entitled "Hardware Symbology and Text Generator in a Graphics Processor," and Ser. No. 07/582,695, filed on Sep. 14, 1990, entitled "Hardware Multiprocess Scheduler in a Graphics Rendering Processor," all by John M. Peaslee and Jeffrey C. Malacarne, whose teachings are incorporated herein by reference.

BACKGROUND

The present invention relates generally to digital graphic display processors, and more particularly, to a multifunction graphics rendering processor which provides both multiple hardware based graphics generating capability and programmable general purpose processing.

Real time digital electronic displays are used in many applications such as military command and control workstations and air-traffic control systems. In these displays, the displayed information typically comprises real-time processed data generated by a host processor adapted to receive real-time information from one or more radars, communications systems and/or other data processors. These data are combined with one or more graphic primitives, such as polylines, vectors, circles, ellipses or polygons, along with generated alphanumerics, mask areas and texture patterns to provide a relatively easily understood comprehensive graphic display on an output device such as cathode-ray tube. In contemporary systems, the various components of the graphics display such as the graphic primitives, mask windows, fill texturing and the like are provided either by a general purpose computer based graphics generator or by a hardware specific graphics generator. Of these, general purpose graphics generators offer system versatility but usually must sacrifice some degree of system performance for ease of programming. On the other hand, hardware specific graphics generators, called cogenerators, provide good system performance and sacrifice programmability.

Increasing demands on military command and control systems, military and civil air-traffic control systems and the like have created a need for a high performance multifunction graphics cogenerator which, in addition, provides a versatile and easily implemented programming capability. It is therefore an objective of the invention to provide a multifunction cogenerator that is a high performance two dimensional graphics engine providing a modular solution to a wide variety of graphic system applications. The multifunction cogenerator is implemented as a integrated circuit chip using large scale integrated circuit logic. The multifunction cogenerator combines both general purpose processing capability with hardware implemented graphics algorithms creating an innovative graphics engine. The multifunction cogenerator performs a complete set of graphic primitives or operations as well as performs general purpose processing functions. This combination allows a user to perform complex graphics operations with minimal required programming. A unique feature of the multifunction cogenerator is provision of two separate drawing channels in parallel within the same device. Each channel provides a command input register and can service a separate host processor if desired. The multifunction cogenerator services one channel at a higher priority than the other solving many problems associated with high performance graphics displays.

SUMMARY OF THE INVENTION

In the broader aspects, the invention is a multifunction graphics processor or cogenerator. The cogenerator is provided with input registers for receiving input data and program instructions from a host processor. A large display memory is provided for storing input data and program instructions. Also provided is a large context register array for receiving and storing system attribute signals determining the cogenerator operating characteristics. Included are a plurality of internal primitive processors for generating primitive signal sets including primitives such as polylines, vectors, polygons, rectangles, circles, ellipses, symbols, alphanumerics, performing bit block transfers, and generating texture patterns and complex clip masks. A display list processor which includes a display memory interface unit is provided to control input and output of data, primitive signal sets, attribute signals, and program instructions to and from the display memory and received from and output to the host processor, primitive processors, and the bit mapped memory of a graphic display.

In specific embodiments of the invention, the primitive processors include a symbol generator for generating symbols such as alphanumerics, a bit block transfer operator for moving and transferring blocks of data, a conics and area fill generator for generating primitives such as circles, ellipses and polygons in both fined and unfilled formats, and a block texturing and complex clipping processor for generating texture patterns and performing a variety of complex clipping and masking functions.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
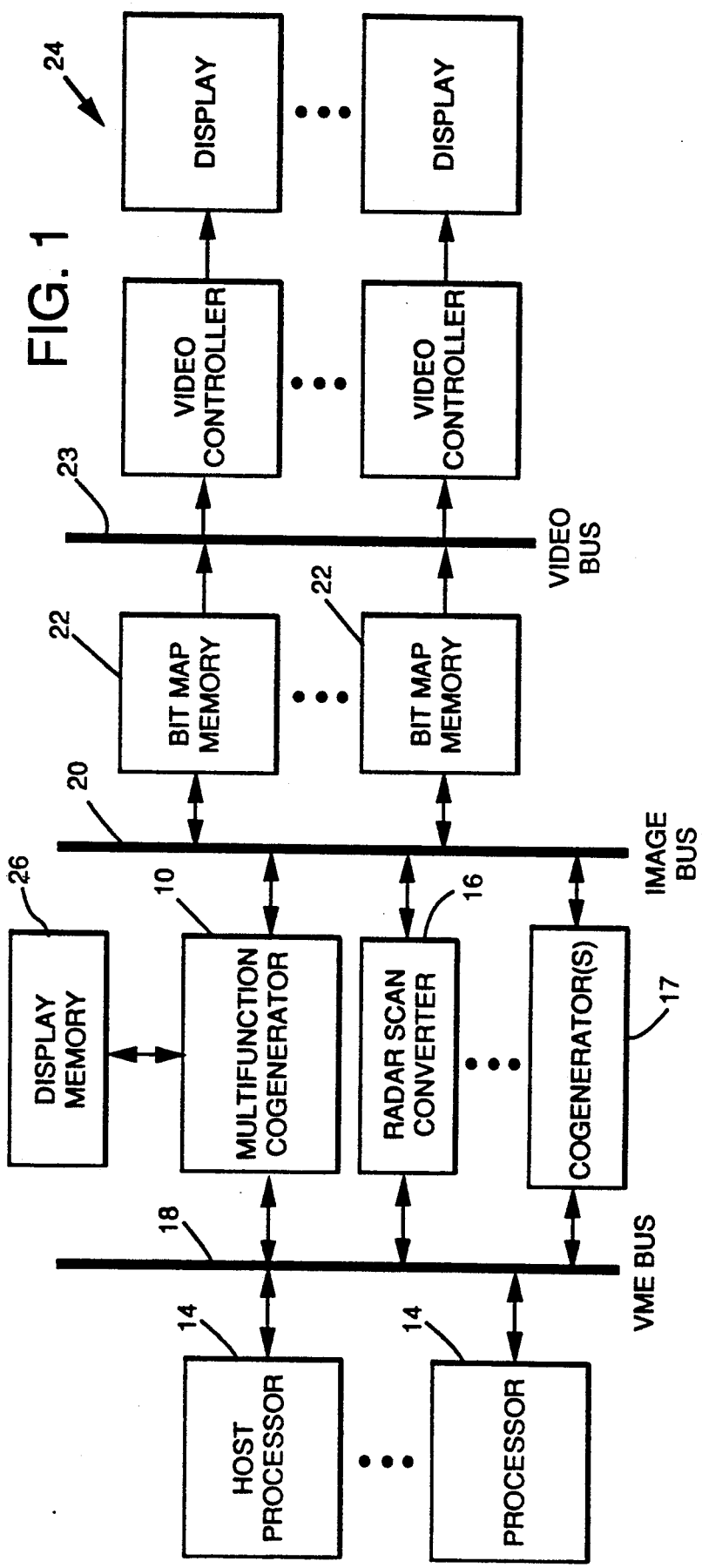
FIG. 1 is a basic block diagram of a system that incorporates a dual channel multifunction cogenerator of which the present invention forms a part.

Referring to the drawings, FIG. 1 is a block diagram of a generalized graphic display system including a dual channel multifunction cogenerator 10 of which the present invention forms a part. The cogenerator 10 is a dual channel, hardware based device which operates in conjunction with one or more general purpose data processing systems, such as a military command and control system. Briefly, the system comprises one or more real rime data processors 14 and other real time data accumulating devices such as a radar system 16 and other cogenerators 17. The host processor 14 and the radar scan converter 16, for example, feed data into the cogenerator 10 via a multifunction bus 18 where it is combined with graphics data generated by the cogenerator 10. The cogenerator 10 outputs a complete set of data for generation of a graphics display via a 64-bit bidirectional interconnect image bus 20 into a bit map memory 22 and then by way of a video bus 23 to a display system 24. The cogenerator 10 may include various other input devices such as manual input output devices, multiple real time processors, bulk memory devices and the like.

Figure 2:
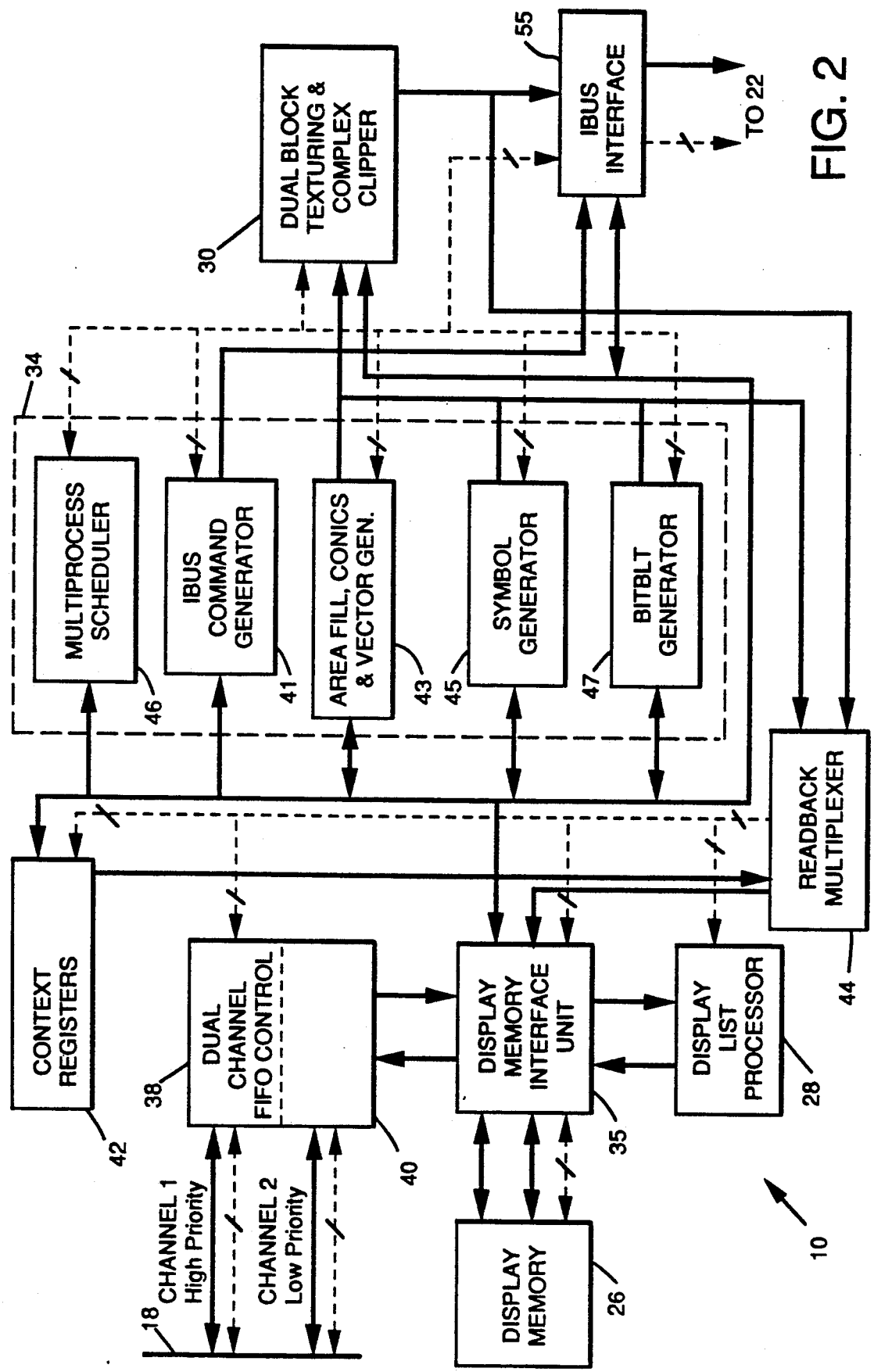
FIG. 2 is a detailed block diagram of the multifunction cogenerator of the present invention.

With reference to FIG. 2, the cogenerator 10 is a high performance single chip graphics rendering processor. It generates multiple graphics primitives and performs general purpose processing functions. The cogenerator accepts graphic commands over a thirty-two bit bidirectional host input port from a processor such as the host processor 14 of FIG. 1. The cogenerator 10 processes these commands and then draws into the bit mapped memory 22. The cogenerator 10 "draws" into the bit mapped memory 22 over the image bus 20. "Drawing" is performed by entering binary one and zero signals (drawing ones and drawing zeros herein) into individual memory locations of the bit mapped memory 22. Typically, the bit mapped memory 22 has multiple memory layers with the layers corresponding to color and intensity of graphic display pixels. The image bus 20 is a 64 bit bidirectional multi-user bus. The cogenerator 10 can draw graphic primitives such as symbols, polylines, rectangles, circles, ellipses, arcs, polygon fills, and perform bit block transfers (BITBLT) between the cogenerator 10, the host processor 14, and the bit mapped memory 22.

Directly associated with the cogenerator 10 is a triported display memory 26. The display memory 26 stores all commands and parameters and includes appropriate logic required for the cogenerator 10 to function properly. The memory address space in a working embodiment is 4 megabytes by 32 bits. The cogenerator 10 interfaces with either DRAMS, SRAMS, and/or PROMS. The display memory 26 is accessible by the cogenerator 10 display list processor 28, the cogenerator 10 internal graphics generator 34, and the host processor 14. Stored in the display memory 26 are two first in, first out (FIFO) memory buffers one of the buffers being assigned a higher operational priority than the other and there being one buffer memory for each of two drawing channels. An address stack is provided for each FIFO buffer to store subroutines calls. An attribute stack stores all internal cogenerator attributes for hardware context switching, a sin/cosine table for drawing graphics, and up to 128 font tables to draw stroked and/or dot matrix symbols and characters. A large display list region is also provided.

The display memory 26 is comprised of up to four million words of RAM organized as 32 bit data words and appropriate buffer logic. The contents of the display memory 26 may be organized as shown in Table I below. The host processor 14 has the ability to perform random reads and writes at any address within the display memory 26 address space. The cogenerator 10 monitors the input of data from the host processor 14 to the display memory 26 to synchronize updating of data from the host processor 14 with the output of graphics signals therefrom.

TABLE I

| MEMORY ADDRESS | | DATA TYPE |
| --- | --- | --- |
| 4M | } | DISPLAY LIST |
| 520K | } | FONT TABLE |
| 8K | } | SINE/COSINE TABLE |
| 7K | } | ATTRIBUTE STACK |
| 6K | } | FIFO 2 |
| 2K | } | FIFO 1 |
| 1K | } | SUBROUTINE STACK 2 |
| 512 | } | SUBROUTINE STACK 1 |
| 256 | } | INTERRUPT TABLE |
| 8 | } | UNUSED |
| 0 | | |

Figure 3:
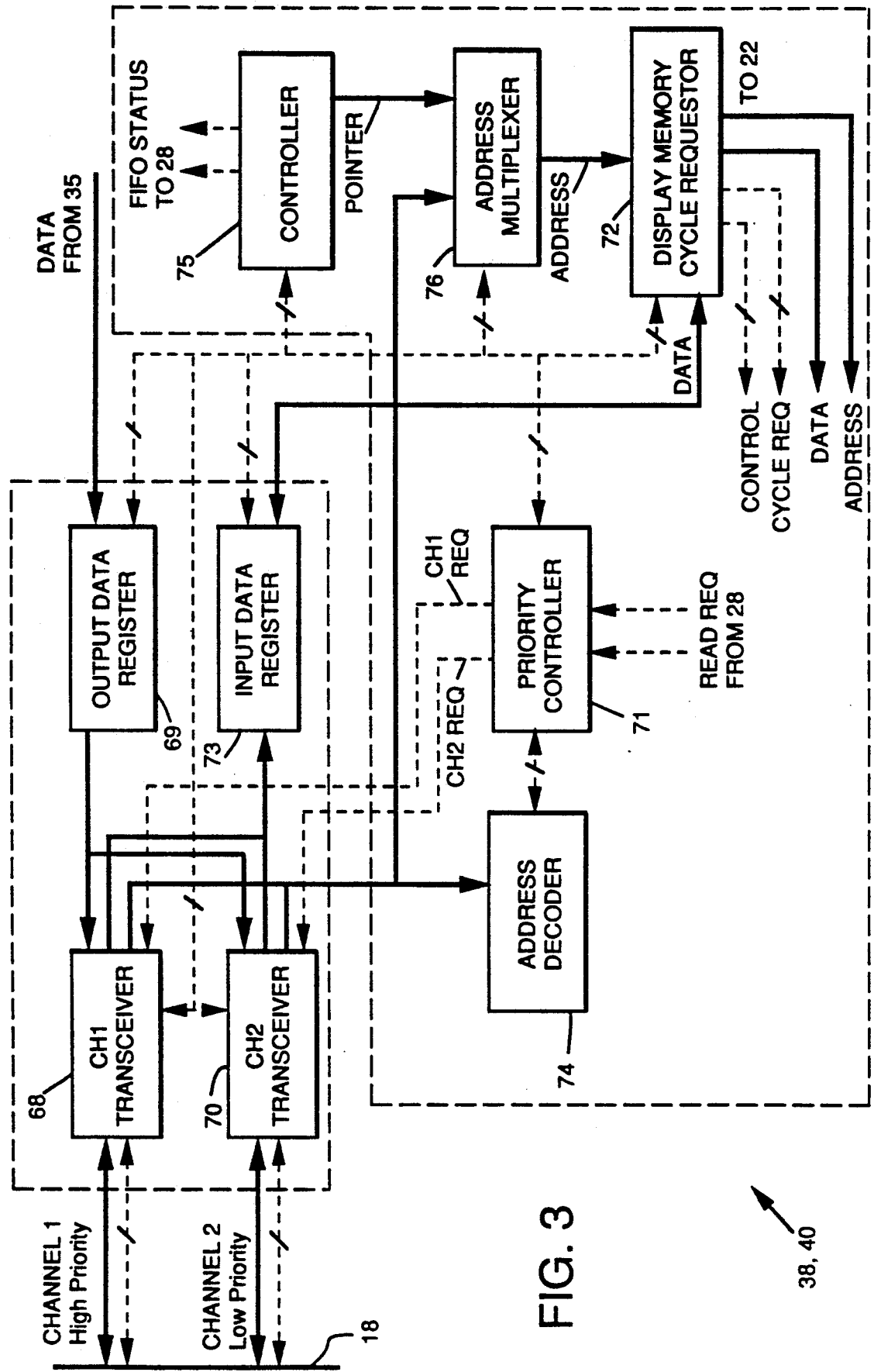
FIG. 3 is a block diagram of the dual channel FIFO controller of the cogenerator of FIG. 2.

A dual channel FIFO buffer controller 38, 40 interfaces the cogenerator 10 to the host processor 14, and is shown in FIG. 3. The FIFO buffer controller 38, 40 are responsible for performing all interfacing duties such as proper "hand shaking" when the bus 18 is performing data transfers. The host processor 14 is able to both read and write to the cogenerator 10 and the display memory 26. When the host processor 14 reads or writes to the display memory 26, the FIFO buffer controller 38, 40 actually performs the read or write operations to the display memory 26 for the host processor 14. The FIFO buffer controller 38, 40 is also responsible for arbitrating high and low priority channels to the cogenerator 10. An address stack is provided internally within the display memory 26 to store subroutine calls, an attributes stack to store all internal attributes required by the cogenerator 10 to perform hardware context switching, a sine/cosine table of drawing conics and primitives, up to 128 font tables to draw both stroked and dot matrix symbols and characters and a large display list region.

FIG. 3 shows a block diagram of the FIFO controller 38, 40. The dual channel FIFO controller 38, 40 receives a command from the host processor 14. The channel 2 interface transceiver 70 accepts the data, address and provides proper handshaking with the host processor 14 to complete the bus transfer. The channel 2 interface transceiver 70 then activates a channel 2 request. A priority controller 71 monitors both channel 1 request and channel 2 request activity. In this case channel 1 is idle and channel 2 has received a command for FIFO2. The function of the channel 2 interface transceiver 70 is to set priority and determine what kind of memory cycle to perform. When the channel 2 interface transceiver 70 determines the cycle type, it tells the display memory cycle requester 72 to perform the cycle. The priority controller 71 receives a channel 2 request and loads the input data register 73 with the data sent from the host processor 14. The input data register 73 sends it's contents to the display memory cycle requester 72. An address decoder 74 decodes the current host processor address. The priority controller 71 uses this information to determine what the host processor 14 is attempting to do. In this case a write to FIFO2 is occurring. The priority controller 71 selects the FIFO2 write pointer from a FIFO controller 75. The priority controller 71 controls an address multiplexer 76 and selects the FIFO2 write pointer. The address multiplexer 76 sends the FIFO2 write pointer value to the display memory cycle requester 72. Now the priority requester 71 commands the display memory cycle requester 72 to perform a write cycle to FIFO2. The display memory cycle requester 72 has the proper address and data. It now issues a cycle request to the display memory interface unit 35.

The channel 1 transceiver 68 operates in much the same manner as the channel 2 transceiver 70. The output data register 69 is used when the host processor 14 is reading data from the multifunction cogenerator 10. The host processor 14 can read data from the multifunction cogenerator 10 or the display memory 26. In either case, the data that is to be sent to the host processor 14 during a host read cycle is stored in the output data register 69 before being sent to the host processor 14. The read cycle is completed when the data is sent from the output data register 69 to either the channel 1 or channel 2 transceiver 68, 70. The transceivers 68, 70 then place the data onto the bus 18 thus completing the read cycle.

Figure 4:
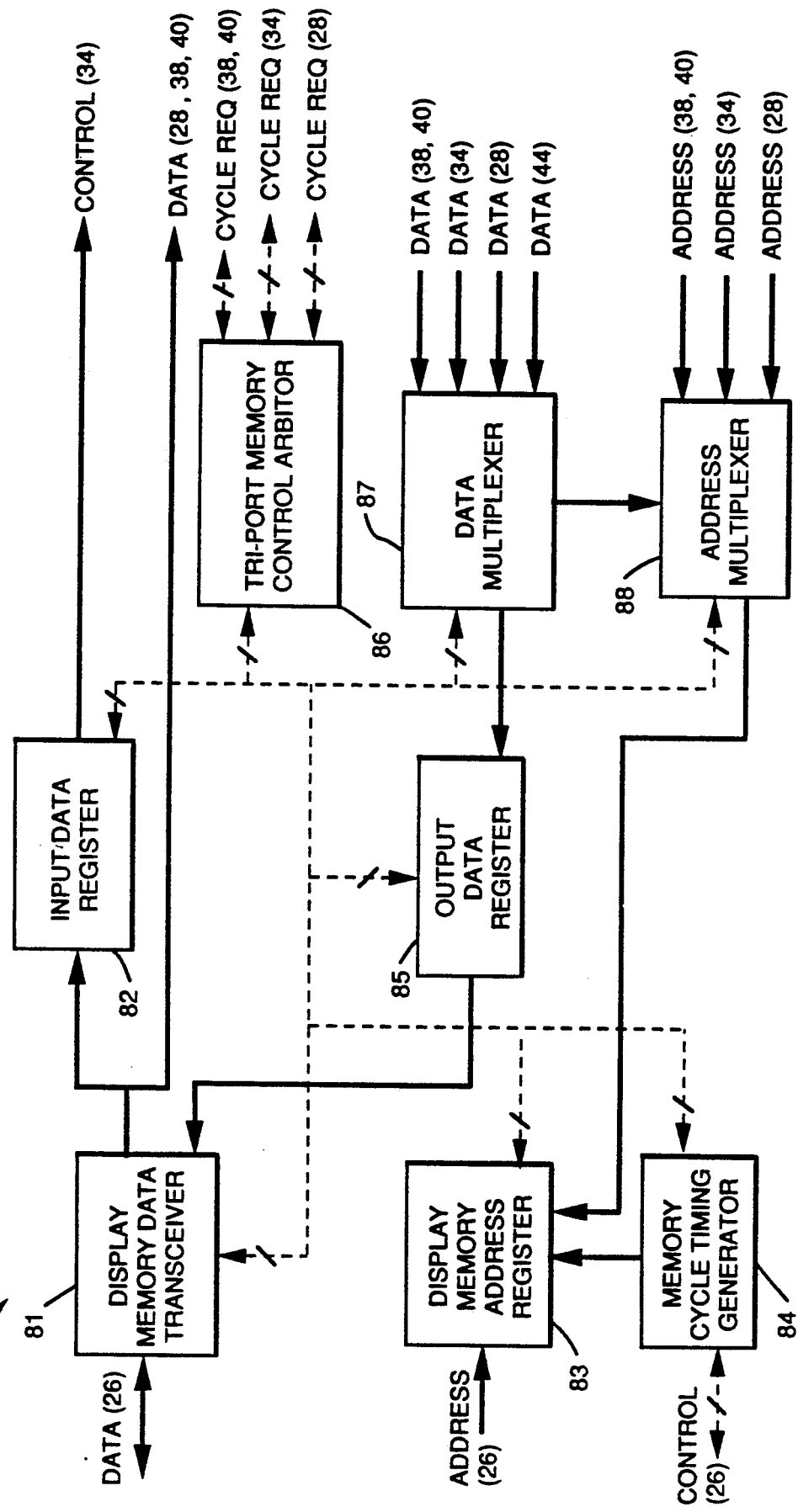
FIG. 4 is a block diagram of the display memory interface unit of the cogenerator of FIG. 2.
Figure 5:
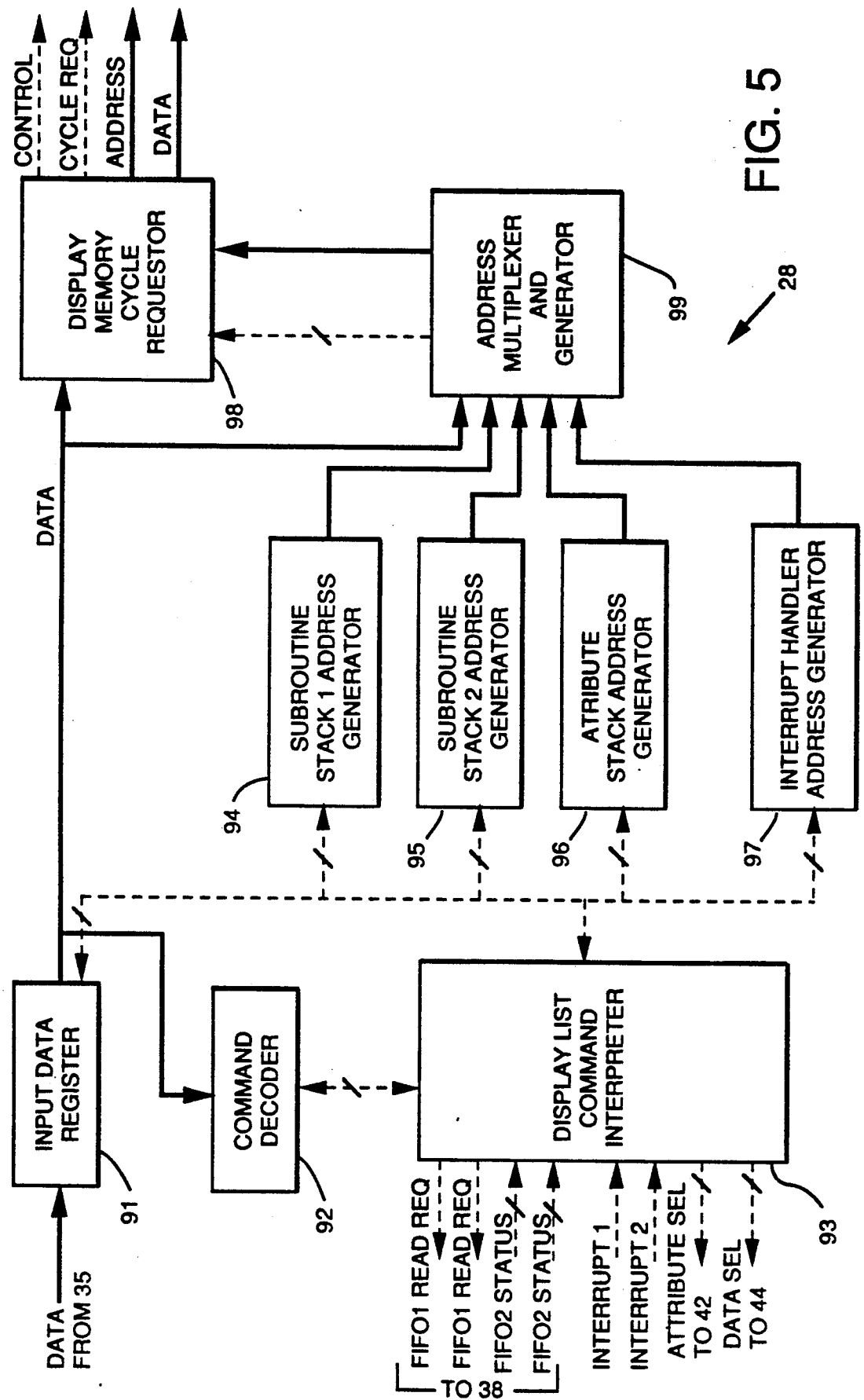
FIG. 5 is a block diagram of the display list processor of the cogenerator of FIG. 2.

A display memory interface unit 35 performs the actual display memory memory cycles, and is shown in FIG. 4. It is essentially a tri-port memory controller. A display list processor 28 performs all of the cogenerator 10 command and display list processing, and is shown in FIG. 5. Commands are sent to the cogenerator 10 from the host processor 14. The display list processor 28 handles the various ways that commands can be sent to the cogenerator 10. The display list processor 28 interfaces to the display memory 26 using the display memory interface unit 35, reads commands from the FIFO buffers as well as performs other functions. When a command is given to the display list processor 28, it processes the command and determines what action to take. The cogenerator 10 provides many different commands and sequences. The host processor 14 can send commands to the multifunction cogenerator 10 through FIFO1, FIFO2, or the display list region of the display memory 26. The display list processor 28 processes commands from any of these locations. The display list processor 28 is also responsible for controlling the attribute stack in the display memory 26 during context switches. Also, the display list processor 28 controls both the channel 1 and channel 2 subroutine stacks also located in the display memory 26.

Referring to FIG. 5, a block diagram of the display list processor 28 of the present invention is shown. The display list processor 28 comprises an input data register 91 that is coupled to a command decoder 92 a display memory cycle requester 98 and an address multiplexer and generator 99 for coupling of data thereto. The input data register 98 also has control lines coupled to the command decoder 92, a display list command interpreter 93, first and second subroutine stack address generators 94, 95 an attribute stack address generator 96, an interrupt handler address generator 97, the display memory cycle requester 98 and the address multiplexer and generator 99. The display list command interpreter 93 is coupled to the FIFO controller 38, 40 by way of FIFO read request and status lines, coupled to external computers, such as the host processor 14 by way of interrupt lines, and to the context register 42 and readback multiplexer 44 by way of attribute and data select lines. The data memory cycle requester 98 is coupled to the display memory interface unit 35 which in turn is coupled to the display memory 26. The operation of the display list processor 28 is described in more detail below with reference to Table I, and FIGS. 4–6.

The display list command interpreter 93 provides the functions of a concurrent processing circuit, an interrupt input circuit, and a restore control circuit. The interrupt handler address generator 97 provides the functions of an interrupt input circuit, a nested interrupt input circuit, a restore execution circuit, and a multilevel nested interrupt circuit. The first and second subroutine stack address generators 94, 95 function as nested subroutine circuit and push down stacks. The operation of these circuits is discussed in more detail below.

Figure 6:
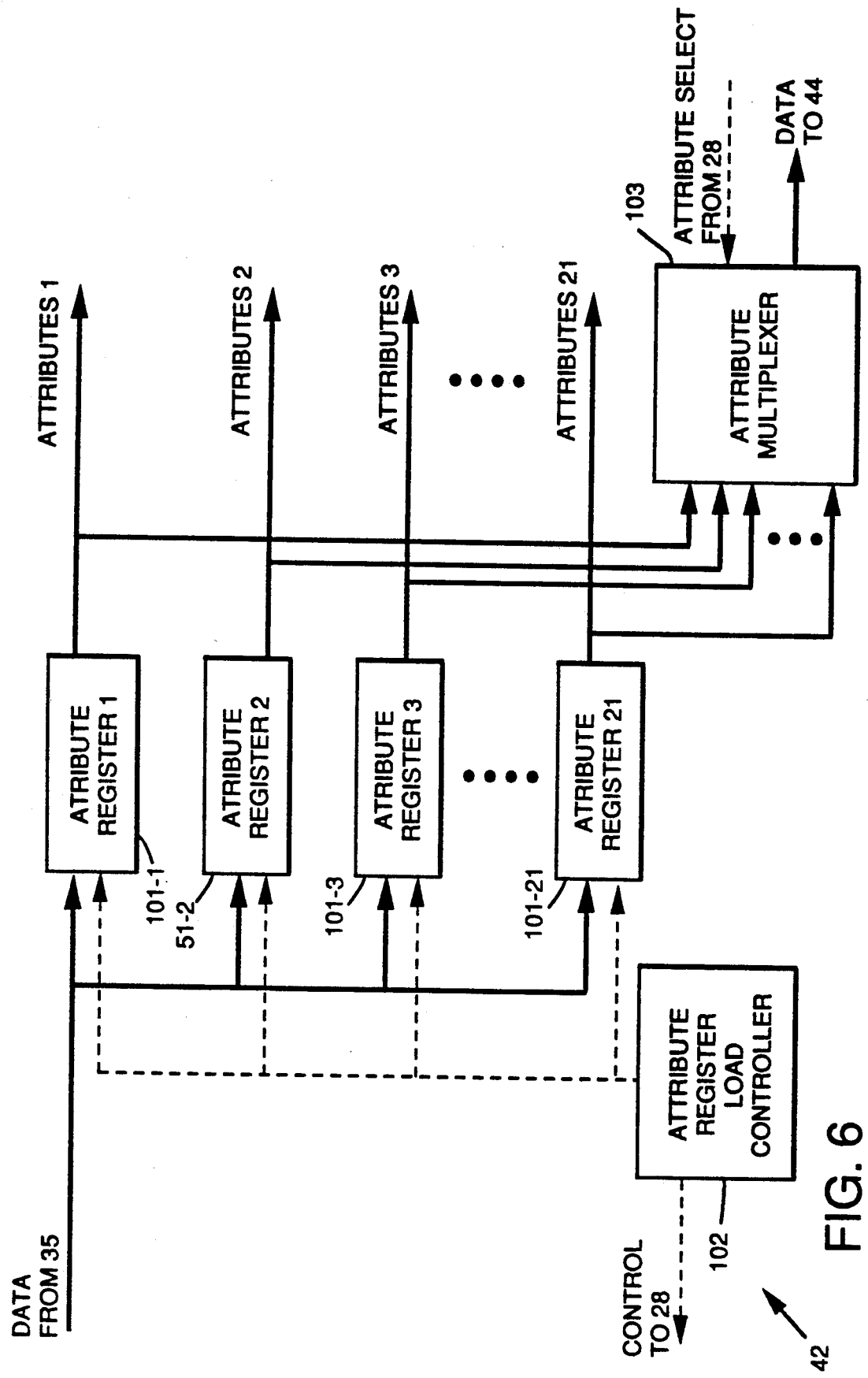
FIG. 6 is a block diagram of the context registers of the cogenerator of FIG. 2.

Context registers 42 store all of the cogenerator attributes, and are shown in FIG. 6. These attributes define the current state of the cogenerator 10. The current state may include a large number of parameters such as: cogenerator operational mode; draw pointer position; foreground color, background color; clipping window dimensions; etc. The contents of the context registers 42 are important as they define the personality of the cogenerator 10 at any given time and all attributes are user programmable. This gives a user considerable flexibility in operating the display system.

Referring to FIG. 6, a detailed block diagram of the context registers 42 is shown. The context registers 42 are comprised of 21 attribute registers 101-1 to 101-21, and attribute register load controller 102 and an attribute multiplexer 103. The context registers 42 are coupled to the display memory interface unit 35, to the display list processor 28, and the readback multiplexer 44 as indicated in FIG. 6.

To start a context switch, the cogenerator 10 processes a "PUSH attributes" command. The display list processor 28 reads in a command from the display memory 26. A PUSH command is placed into either the FIFO buffers or a display list. The command decoder 92 (FIG. 5) detects a PUSH command and informs a display list command interpreter 93 that selects the attribute data bus input to the readback multiplexer 44. This bus runs from the context registers 42 to the readback multiplexer 44 as shown in FIG. 2. The output of the readback multiplexer 44 is sent to the display memory interface unit 35. The display list processor 28 selects the attribute bus for input to the display memory interface unit 35 so all the cogenerator attributes are sequentially loaded into the attribute stack located in the display memory 26. The attribute stack is a 1K, block of memory broken up into 32 tables each having 32 entries. Each table holds one cogenerator context, or state, typically with some unused entries.

Once the attribute bus is selected for input to the display memory interface unit 35, the command interpreter in the display list processor 28 sends the attribute select code to the context registers 42. The interpreter cycles through 21 codes to extract all 21 attribute register values out of the context registers 42. This happens sequentially to perform the PUSH operation. The attribute select code connects to the attribute multiplexer 93 in the context registers 42. The first code sent selects attribute register 1 for output. The attribute multiplexer 93 drives the data to the readback multiplexer 44. The first attribute value is at the input to the display memory interface unit 35. The command interpreter in the display list processor 28 controls the attribute stack address generator 96.

Also provided is a readback multiplexer 44 which is a large data multiplexer. It is used to multiplex data to the display memory interface unit 35 which is directed to either the display memory 26 or back to the host processor 14 via bus 18. Three readback data sources are the context registers 42, a graphics generator 34 defined within the dashed block in FIG. 2, and a block texturing and complex clipping processor 30. If the data is intended for the host processor 14 it will be sent through the FIFO buffer controller 38, 40 by the display memory interface unit 35. The graphics generator 34 is connected to the readback multiplexer 44 for various cogenerator 10 drawing operations. The block texturing and complex clipping processor 30 also sends data to the readback multiplexer 44 for various cogenerator 10 operations. Details of the block texturing and complex clipping processor 30 are shown in FIG. 7.

Figure 7:
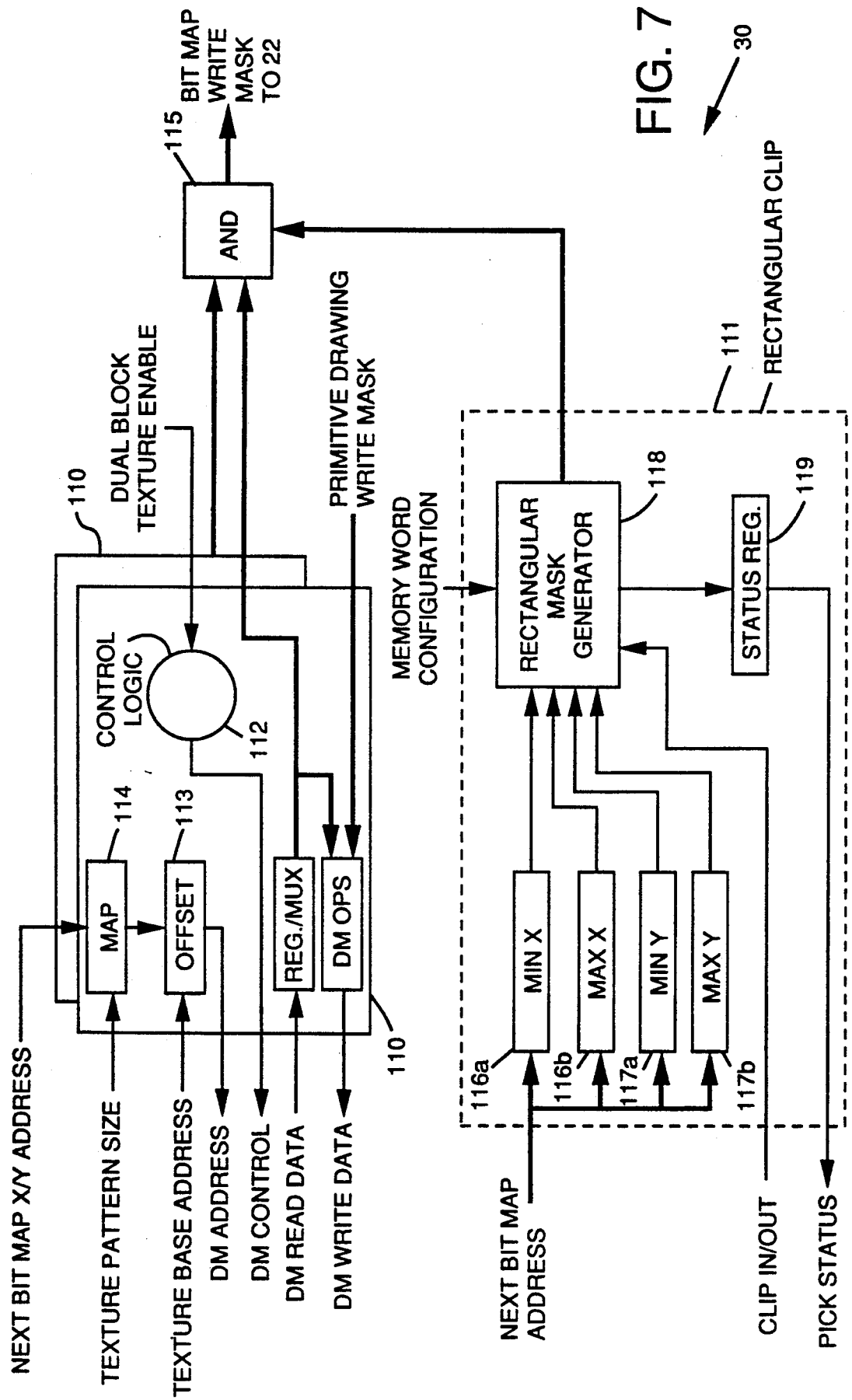
FIG. 7 is a block diagram of the block texturing and complex clipping processor of the cogenerator of FIG. 2.

Referring now to FIG. 7, the block texturing and complex clipping processor 30 is shown in more detail in conjunction with related portions of the cogenerator 10. The block texturing and complex clipping processor 30 comprises three functional sections: a texture generating section 1 10, a rectangular clip section 111, and a combinational logic section 112. Included within the texture generating section 110 is a mapping processor 113 and an address processor 1 14. To perform a texturing function, the next bit mapped memory 22 x, y address is applied to the map processor 113, this address being the next address in the bit mapped memory 22 to be written to by the cogenerator 10. Simultaneously, a programmable texture pattern size signal and the display memory 26 address of a desired texture pattern are entered into the mapping processor 113 and address processor 114, respectively. The texture pattern size is specified as a rectangular parameter measured in pixels and in a wording embodiment must be defined as a square pattern having pixel dimensions that are multiples of 16, i.e., 16 by 16, 32 by 32.

In a working embodiment, the mapping processor 113 and the address processor 114 are provided in duplicate enabling the implementation of two texture patterns at any one time. With the texture pattern sizes and texture pattern addresses specified, the mapping processor 113 is coupled through the FIFO buffers 38, 40, display memory interface unit 35 and display list processor 28 to the appropriate address or addresses in the display memory 26 which contain the texture patterns. The display memory may contain any desired number of texture patterns. These patterns can be down loaded into the display memory 26 from the host processor 14 or otherwise programmed into the display memory 26. However, at any one time, only two texture patterns are directly addressed by the mapping processor 113, this being accomplished through appropriate address pointers. The area fill, conic and vector generator 43 symbol generator 45, or BITBLT generator 47 generate all primitive profiles, area fill, and associated clip mask signals. These signals are applied via a data bus to one input of an AND logic function 115 in the combinational logic section 112. The texture pattern signals are output from the display memory 26 through the display memory interface unit 35 to other inputs of the AND function, 115. The result of the logical combination of primitive, primitive clip mask and texture signals by the logic section 112 is a textured primitive signal set.

If only one texture pattern is requested, the primitive or symbol will be combined with the single texture pattern. If two texture patterns have been specified, the texture patterns can be implemented separately or they can be combined. For example, if one texture pattern comprises horizontal lines and the second comprises vertical lines, these two texture patterns can be applied individually to different primitives to produce primitives having a horizontal line texture pattern and primitives having a vertical line texture pattern. The two texture patterns can also be combined. This will produce a primitive with a checkerboard textured pattern. A primitive can also be rendered with no texture pattern thereby providing up to four textures using two directly accessed texture patterns. It will be further appreciated that the outputs from the area fill, conics, and the vector generator 43 symbol generator 45 and BITBLT generator 47 include clip mask signals which negate output signals or pixel signals outside of the generated primitive. Thus, the texture pattern will appear only within the primitive or symbol.

It will further be appreciated that if the conic, vector and area fill generator 43 outputs an outline primitive, that is, a primitive that is only an outline and not a solid, the texture pattern will be applied to only this outline. For example, if the conic generator 43 generates an ellipse outline primitive, this primitive combined with a texture pattern comprising horizontal lines results in an ellipse drawn as a series of broken lines.

The cogenerator 10 has the ability to render any primitive into the display memory 26 as a series of ones or zeros. This capability enables the use of texture patterns to create arbitrarily shaped or "complex" clip masks. Complex clipping is the ability to clip images to randomly shaped regions such as circles, pie shapes, polygons, and the like as well as rectangular regions. This capability solves the problem of overlapping various randomly placed display windows on a display. Complex cupping provides a way to update non-rectangular regions in one operation.

Another function of the block texturing and complex clipping processor 42 is rectangular clipping. The block texturing and complex clipping processor 42 provides two modes of rectangular clipping. These are inside clipping and outside clipping. The rectangular clip section 111 includes a set of registers 116a, 116b, 117a, 117b used to programmably define the size and location of the rectangular clip window such as the window. The rectangular clip window is defined by two points, the upper left hand corner and the lower right hand corner. This specifies the rectangular region that ranges from 0 to 4,095 pixels in both the x and y directions. The cogenerator 10 automatically inputs the next bit mapped memory 22 address into the rectangular clip registers 86-92.

If rectangular clipping has been activated, a rectangular mask generator 118 controlled by the cogenerator 10, automatically clips as it draws any primitive. As the drawing address changes, the cogenerator 10 continually performs comparisons between the current bit mapped memory 22 address and x, y pixel addresses defined by the clipping window boundary. If the pixels are members of the region to be clipped (pixels inside the clip window), the cogenerator 10 will simply ignore these pixels and continue processing. If the pixels are members of the clipped region, the cogenerator 10 then writes into the bit mapped memory 22 and continues processing the primitive. It will be seen that it is possible for a drawing operation performed by the cogenerator 10 to enter and exit a clipping window multiple times. To perform this function, the rectangular clip signals output from the rectangular mask generator 118 are then combined with the textured primitive signal set output from the texture generating section 110 in the AND logic function 115. This results in the rectangular clip window overlaying a textured primitive.

As a further feature of the invention, the clipping function and the rectangular clip functions are performed both in the conventional manner of outside clipping in which pixels exterior of a primitive are clipped or in the reverse manner of inside clipping in which pixels inside the primitive are clipped. This is effected by a programmable clip in/clip out control attribute which reverses the masking function for the rectangular clip function or by reversing the generation of drawing ones and drawing zeroes patterns as described above for complex clip windows.

To provide for "picking" the rectangular clip function further includes means for comparing primitives and clip window boundaries. As the cogenerator 10 processes a primitive and simultaneously performs rectangular clip mask functions, the cogenerator 10 determines whether a particular primitive lies within a clip window. This function can be used to automatically expand or contract clip windows to match primitive dimensions and is indicated by the output of status register 119.

The graphics generator 34 generates cogenerator primitives and symbols and performs bit block transfers (BFMLTs). The graphics generator 34 includes a multiprocess scheduler 46 shown in FIGS. 8 and 9, a command generator 41 shown in FIG. 10, an area fill conic and vector generator 43 shown in FIG. 11, a symbol generator 45 shown in FIG. 12, and a BITBLT address generator 47 shown in FIG. 13. The area fill, conics and vector generator 43 creates digital signals representing graphics primitives such as polylines, rectangles, circles, ellipses and polygons and area fills. These primitive signals are next combined with other digital signals representing alphanumeric and other symbols, which are generated in a symbol generator 45, and with yet a third set of signals generated by block texturing and complex clipping processor 30 to produce the final set of signals which is then transferred by the BITBLT address generator 47 into specified pixel addresses in the bit mapped memory 22. Typically, the bit mapped memory 22 has multiple memory layers which set the color and intensity for the graphics display defined for each pixel location therein.

The multiprocess scheduler 46 controls data transfers between elements of the cogenerator 10. The multiprocess scheduler 46 uses a branched scheduler approach to control the several operations and apply certain characteristics of a software operating system thereto. This promotes functional independence between various cogenerator 10 sequences and provides a mechanism for inter-unit communication.

Figure 8:
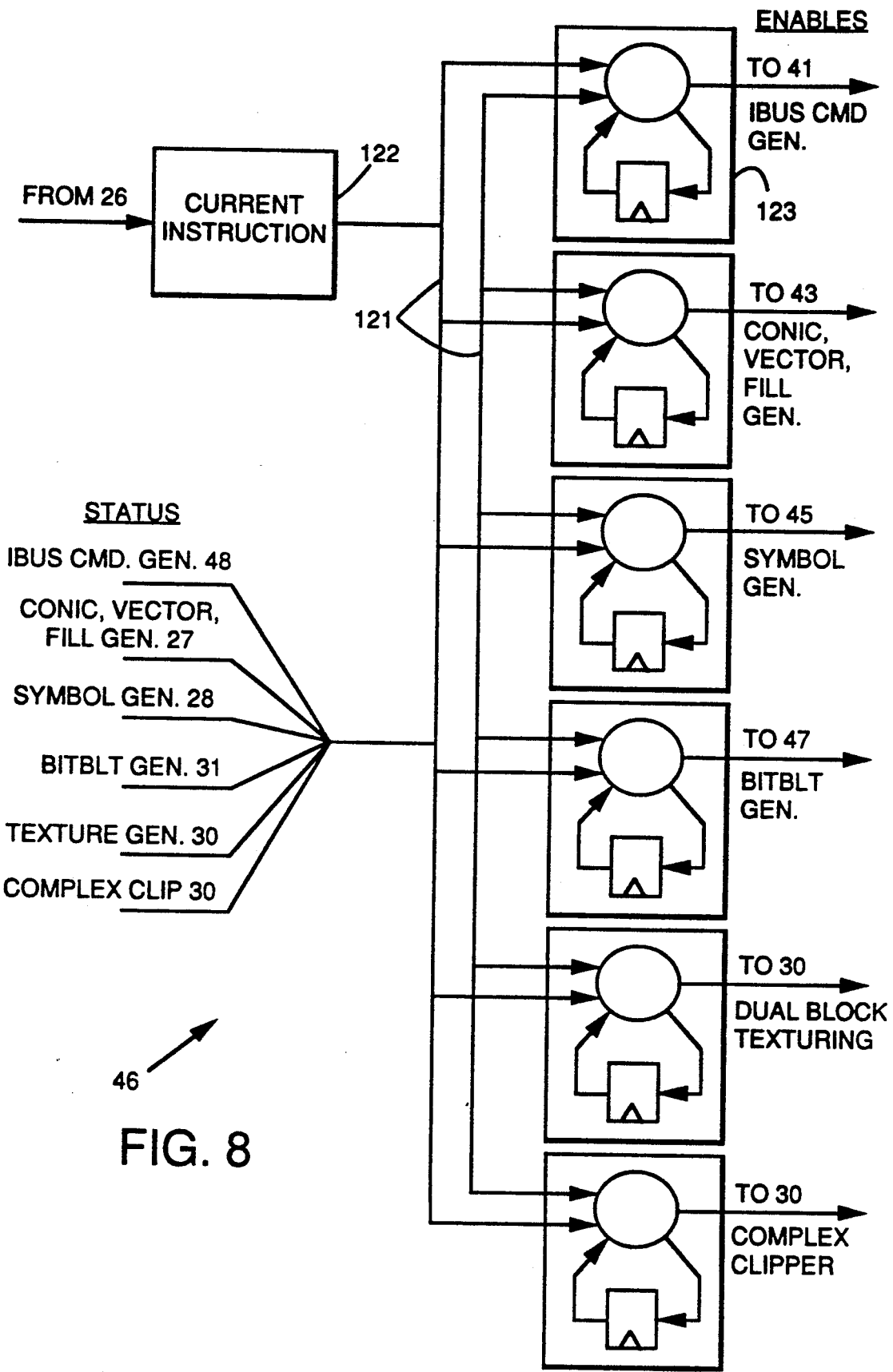
FIGS. 8 and 9 are block diagrams of the multiprocess scheduler of the cogenerator of FIG. 2.

The functional characteristics of the hardware multiprocess scheduler 46 of the present invention are shown generally in FIG. 8. As shown therein, the scheduler 46 controls the flow of data to and throughout the several data generating/processing and control subsystems comprising graphics generator 34 and the block texturing and clip mask generator 30. This involves scheduling (enabling) one or more of the six controlled subsystems, when all required inputs are available for current operation, and blocking (disabling) the controlled subsystem(s) when some other subsystem is utilizing its (their) current output.

In operation, instructions received from the cogenerator 10 keep the hardware scheduler 46 cognizant as to what operation is required by each of the controlled subsystems and when. Each of these subsystems is allowed to begin operation as soon as its local input requirements are met and its current output is no longer needed. This serves to decouple each of the individual controlled units from the overall task, thus allowing the operation of each of the six parallel controlled subsystems to proceed as soon as it is able. This approach removes the need for synchronous request/acknowledge handshaking and its associated overhead during data transfer between operations. Instead, the hardware multiprocess scheduler 46 of the present invention forms a combinational logic function that responds immediately with enable and load strobes whenever new input data are needed by one of the controlled subsystems.

To facilitate command and control in the embodiment illustrated, the hardware scheduler 46 comprises a control interface bus 121 which carries command and control signals from an instruction decoder 122 and status information transmitted from an image bus command generator 41, the conics/vector/fill generator 43, the symbol generator 45, the BITBLT generator 47, the dual block texturing and clipping functions of texturing clipper 30, and six task control units 123. Command and control is applied by means of each of the task control functions utilizing similar status words for each of the functions controlled, with flags indicating either each function's readiness to accept new input, or the availability of new output therefrom. Complex parallelism is accomplished by creating an environment in which the sequenced functions are free to perform their local processing until a transfer operation to or from another cogenerator function is required. In the present invention it is not necessary to account for every possible combination of the states of every sequenced function to ensure that all of the controlled functions work together.

Figure 9:
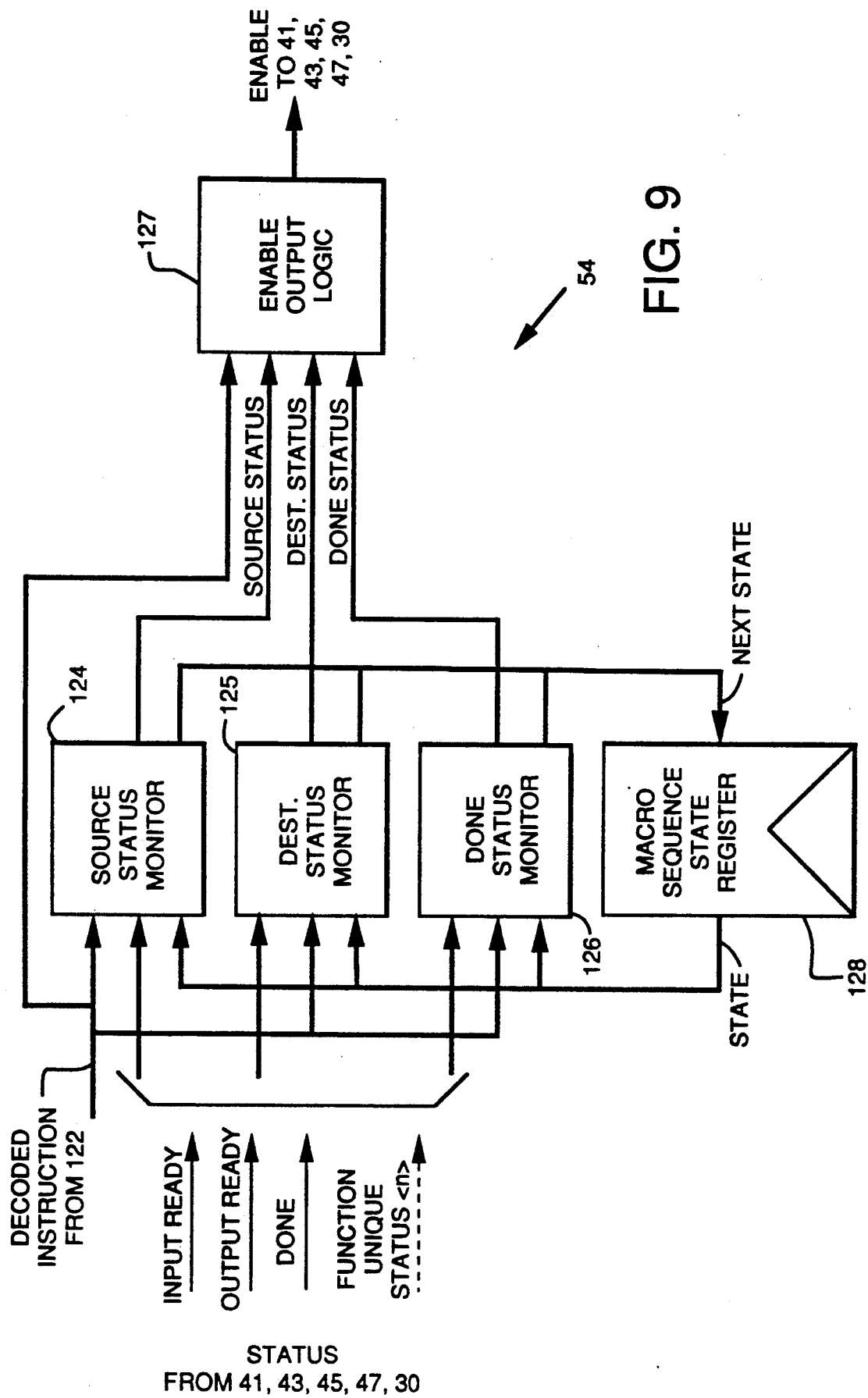

As functionally illustrated in FIG. 9, each of the six task control units 123 comprises four separate subfunctions which, when taken as a whole constitute the control means implemented thereby. These subfunctions comprise source status, destination status, done status and macrosequence status. A source status monitor 124 indicates the availability of valid inputs to the controlled subsystem for further processing, a destination status monitor 125 indicates whether or not the destination is ready to receive the processed data, and a done status monitor 126 indicates whether or not the current processing operation in the controlled subsystem has been completed. These three status conditions are combined in an output logic unit 127 to enable the particular graphics subsystem under control. When multiple input or output operations are required, a macrosequence state register 128 keeps track of these operations to prevent under or over processing of the data.

In practice, whenever a controlled task function is to receive new data, the scheduler 46 determines if a valid input ready signal has been received from the affected cogenerator subsystem if this is the case, the unit is enabled and the data are input from the bus 18, or from other data interfaces between subsystems. At the conclusion of the data input cycle, the controlled subsystem starts processing the data received, in accordance with the particular instructions received by way of the data bus 121 and the instruction decoder 122. When outputs that result from processed input data are ready to be passed to another subsystem, the processing unit transmits an "output ready" flag. Several inputs, whether received concurrently or in sequence, may be required to create a single output. When all required outputs for a given subsystem microsequence operation are completed, the processing unit transmits a "done" flag. Multiple subsystem microsequences may be required to complete the macrosequence for the current cogenerator instruction.

When the unit to which the data are directed has emitted a valid input ready status, the recipient subsystem is asynchronously enabled by the appropriate task control unit 123 with zero clock delay to receive them and, if necessary, process it. If the recipient unit does not show a valid input ready status, then the corresponding task control function captures the output ready function pulse in a macrostate register 128 to indicate that a data transfer is pending. In either case, whenever the receiving unit sends a valid input ready status, it is asynchronously enabled and the waiting data are then transferred thereto. The input ready signal acts as a flag to indicate the current readiness status of the controlled unit.

Figure 10:
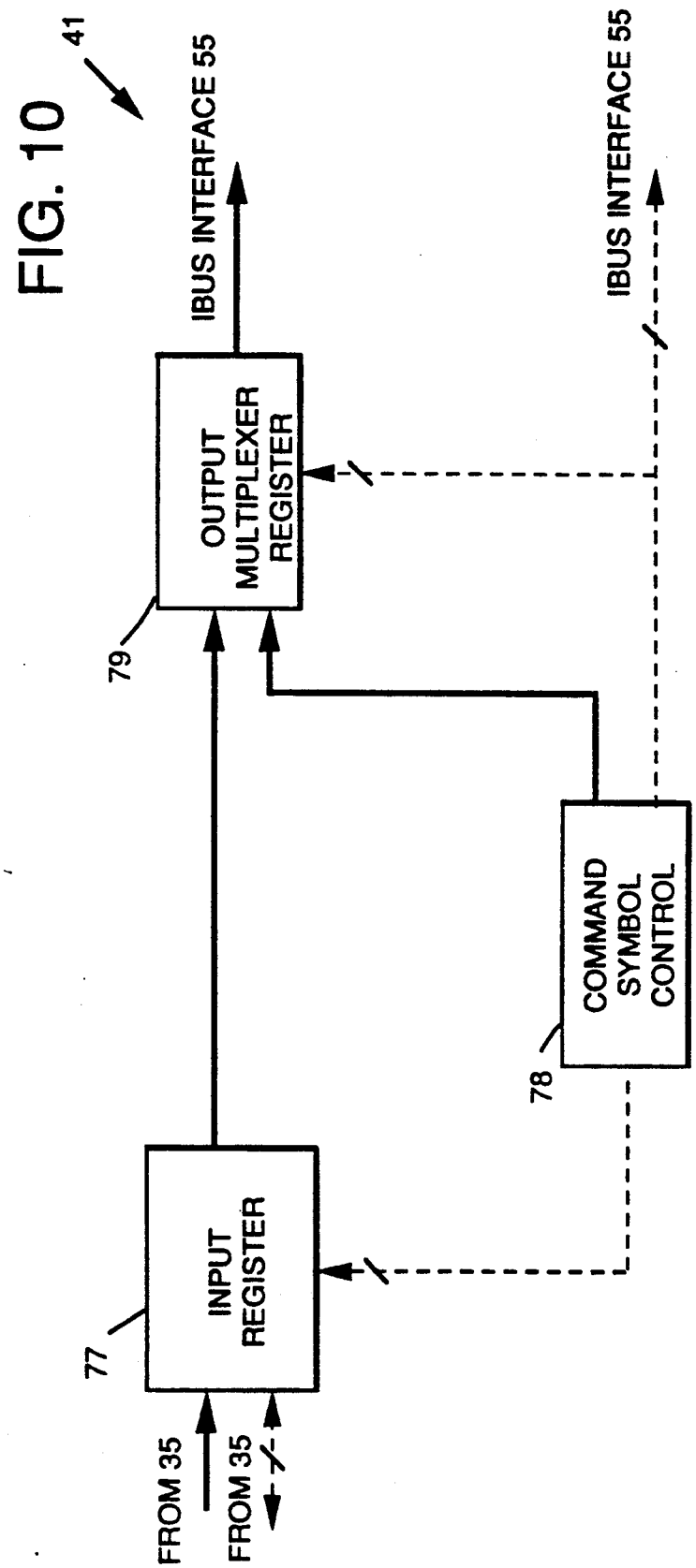
FIG. 10 is a block diagram of the command generator of the cogenerator of FIG. 2.

Referring to FIG. 10, a block diagram of the image bus (IBUS) command generator 41 is shown. The command generator 41 is responsible for performing IBUS command cycles. These command cycles are performed by the cogenerator 10 over the image bus 20 and sent to the bit map memory 22. These command cycles are performed to initialize and start up the bit map memory 22. They are performed by the cogenerator 10 at the request of the host processor 14. This allows the host processor 14 to configure the bit map memory 22 to a structure that works in harmony with the particular graphics system in use. The command generator 41 receives command data from the display memory interface unit 35. The data is loaded into the input register 77. The command sequence controller 78 acknowledges that the data has been received to the display memory interface unit 35. The command sequence controller 78 then sends command type information the output multiplexer/register 79. The input register 77 sends the command data to the output register 79. The command data and command type information are combined at the output register 79 and sent to IBUS interface 55 (FIG. 2). The command sequence control 78 then instructs the IBUS interface 55 to perform the command cycle over the image bus 20.

Figure 11:
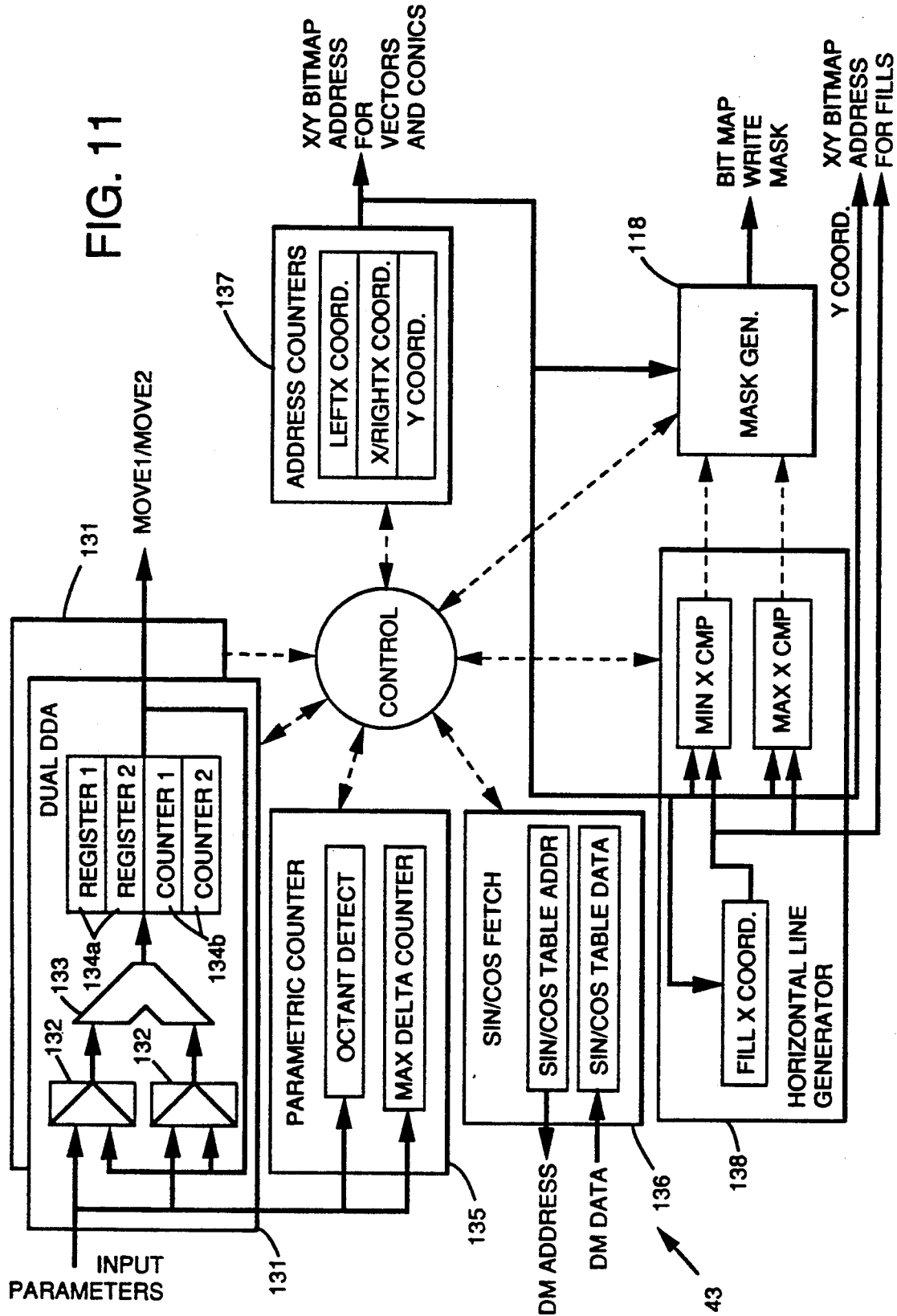
FIG. 11 is a block diagram of the area fill, conic, and vector generator of the cogenerator of FIG. 2.

Referring now to FIG. 11, the area fill, conic and vector generator 43 calculates mathematical solutions for drawing geometric primitives. In overview, the area fill, conic and vector generator 43 is a single circuit which generates vectors, rectangles, circles, ellipses and polygon area fills. The basic building block of the generator is a digital differential analyzer (DDA) 131 which, in operation, accumulates fractional (subpixel) components of x/y coordinate data and signals when the accumulation overflows one or another pixel boundary. This occurrence causes the system to increment or decrement the x and y coordinates that indicate the pixel address to be loaded, or drawn, in the bit map memory 22. In its most general form, the analyzer 131 has a general purpose architecture comprising input means, which feeds input data and instructions into at least two digital differential multiplexers or comparators 132, an arithmetic logic unit (ALU) 133 and a register file 134 comprising two registers and counters 134a, 134b.

In operation, the comparators 132 acquire x and y data by way of the cogenerator 10 and compare these to x and y pixel position data stored in registers 134. Whenever either the x or y data stored in the registers 134a and counters 134b indicate that a pixel boundary has been crossed, the DDA 131 outputs move direction controls for the next pixel address. This process is continued until the primitive shape is completed. In furtherance of this function, the area fill generator 43 also comprises as constituent parts thereof, a parametric counter 135, a sin/cos fetch unit 136, an address counter 137 and a horizontal line generator 138. In the configuration illustrated in FIG. 11, the system provides for considerable versatility in setting up solutions for the subfunctions used to compute the various geometric equations used within the system.

Figure 12:
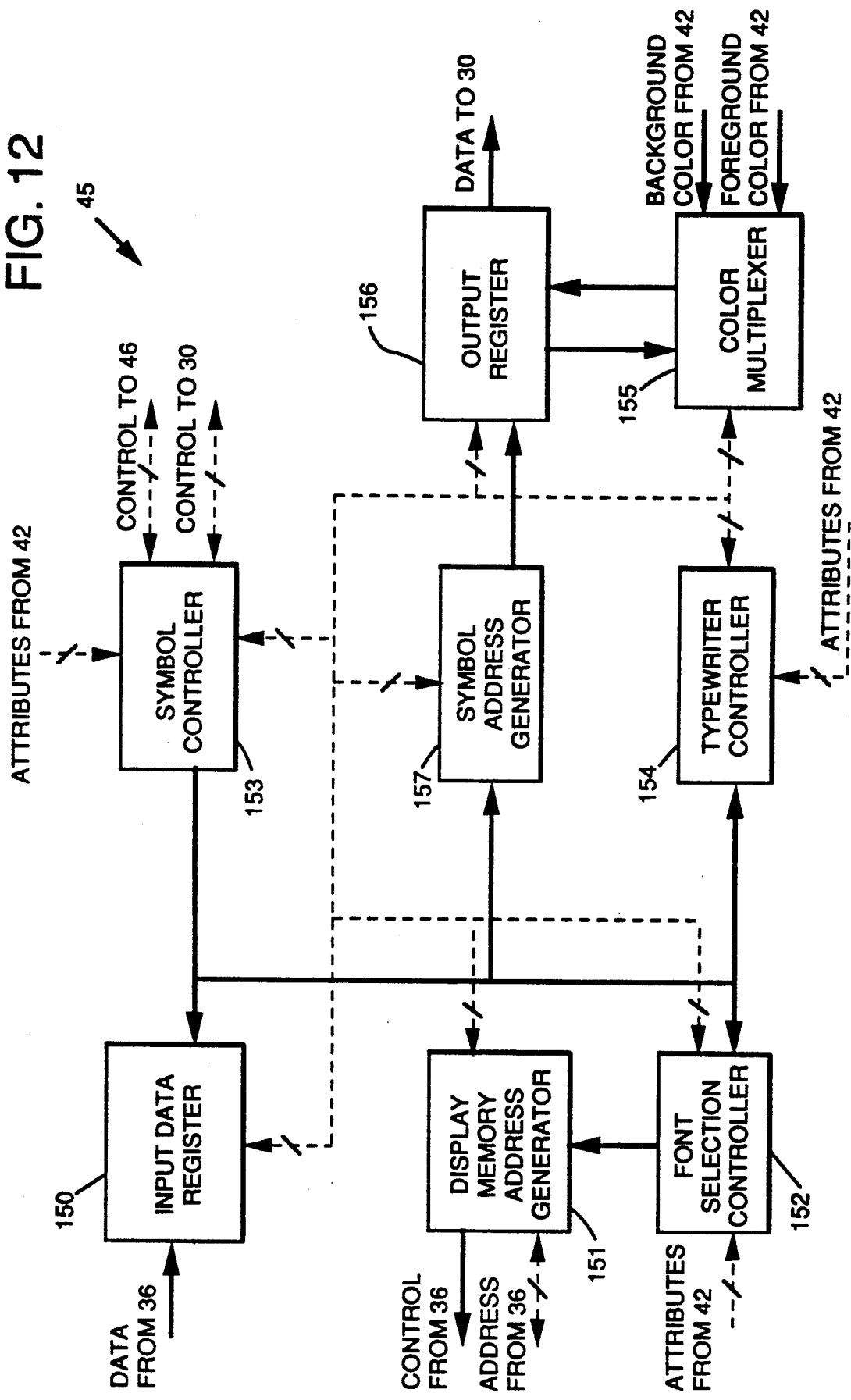
FIG. 12 is a block diagram of the symbol generator of the cogenerator of FIG. 2.

The symbol generator 45 generates alpha numeric symbols. A detailed block diagram of the symbol and text generator 45 is shown in FIG. 12. The basic function of the symbol and text generator 45 is to accept symbol commands from the display memory interface unit 35 (FIG. 2) and generate the symbols and/or text characters. These are referred to as simply symbols hereinafter. As the symbols are drawn they are sent to the block texturing and complex clipper processor 30. Initially, when the symbol generator starts to draw a symbol it accesses an appropriate font table in the cogenerator 10 display memory 26. The display memory 26 contains the necessary information to draw a desired symbol. The cogenerator 10 accesses display memory 26 through display memory interface unit 35.

Referring again to FIG. 12 the symbol generator's input data register 150 is used to store all incoming data from the display memory interface unit 35. This data includes symbol commands, symbol generator programming data, symbol data fetched from the display memory 26 and font table definition attributes. This register 150 temporarily holds this information until it is routed to the proper part of the symbol generator 45.

The display memory address generator 151 is used by the symbol generator 45 to address the display memory 26. The symbol generator 45 performs read cycles from the font tables in display memory 26 when drawing symbology. The display memory address generator 151 contains an address counter. The address is formed from the current font value and a symbol entry counter. The font value is input to the display memory address generator 151 from a font selection controller 84. As mentioned earlier when the symbol generator 45 is told to draw a symbol from a new font table, it reads in new font table definition attributes. The display memory address generator 151 is used to address these values as they are read into the symbol generator 45. The symbol entry counter is simply the current position that the symbol generator 45 is at when drawing a symbol. The symbol generator 45 performs multiple reads from display memory 26 when drawing a symbol. When a symbol is drawn the symbol generator 45 addresses the symbol data starting at the first location of that symbol and sequentially read in symbol data until the symbol is completed. The symbol entry counter is incremented for each symbol data value read.

The font selection controller 152 contains registers and comparators. It's main function is to store the current font table and send it to the display memory address generator 151. Also it must compare any new font table that is sent to the symbol generator 28. If the new font table code differs from the current code the font selection controller 84 informs a symbol controller. This way the new font definition may be read into the symbol generator 45 before symbols can be drawn from the new font table. The font selection controller 152 receives attributes from the context registers 42 which provides font table information.

The typewriter controller 154 contains logic to control the cogenerator 10 typewriter functions. The context registers 42 store the cogenerator 10 attributes and send the typewriter information to the typewriter controller 154. This information includes such things as the current typewrite mode, the carriage return code, line feed code, auto line feed code, typewriter direction, auto symbol spacing etc. The typewriter controller 88 monitors incoming symbol data when each new symbol is to be drawn. If a carriage return or a line feed code is detected, it informs the symbol controller 153. It tells the symbol controller 153 what the typewriter direction is. When a symbol is completed it tells the symbol controller 155 what symbol spacing to use for the next symbol. The typewriter controller 154 helps the symbol controller 86 position the symbols properly to provide all the typewriter features mentioned earlier.

A color multiplexer 155 receives background and foreground color information from the context registers 42. The color multiplexer 155 is controlled by the symbol controller 153. The output of the color multiplexer 155 is sent to a bit map memory output data register 156. This value is used as the color value for the symbol when it is drawn. As mentioned earlier the cogenerator 10 can draw two color symbols. The color multiplexer 155 allows the symbol controller 153 to select either background or foreground color depending upon whether a symbol is being drawn or a background cell is being drawn. Also when inverse video symbols are drawn and foreground and background colors are reversed by the symbol controller using the color multiplexer 155.

The symbol address generator 157 is where the symbols are actually rendered. The symbol address generator 157 draws both dot matrix symbols and stroke coded symbols depending on what is required. The symbol address generator 157 contains registers, counters, comparators and controllers. It is controlled by the symbol controller 153. The symbol controller 153 tells the symbol address generator 157 when to draw symbols and background cells 157 and when to space symbols, perform a carriage return and/or a line feed. The symbol address generator 157 provides feedback to the symbol controller 153 about its current state. The symbol address generator 94 is told what the typewriter direction is by the typewriter controller 154. The symbol address generator 157 also performs the scaling and rotation of the symbols if this is required.

The symbol controller 153 is the main controller of the symbol generator 45. It must insure that all the functions of the symbol and text generator 45 work in harmony to produce symbols. It optimizes the performance of the symbol and text generator 45 by keeping all the pipeline stages full and all the functions actively performing tasks. It loads the input data register 150. It controls the display memory address generator 151. It controls the symbol address generator 157 and color multiplexer 90. It loads the display memory output register 156. It must handshake with both the multiprocess scheduler 46 and the texturing/clipper processor 30. It monitors status from all the functions in the symbol generator 157. It also has inputs from the context registers 42 which are symbol attributes defining many functions that need to be performed in line with the current cogenerator 10 state.

The output register 156 is the final pipeline stage of the symbol generator 45. As symbols are drawn, the display memory output register 156 is loaded by the symbol controller 153. It stores pixel address and color information which is sent to the texturing/clipper processor 30. Eventually this information is sent over the image bus 20 by the cogenerator 10 and drawn into bit mapped memory 22. From there it is displayed on video display 24 as symbols and/or characters with all the features described earlier.

Figure 13:
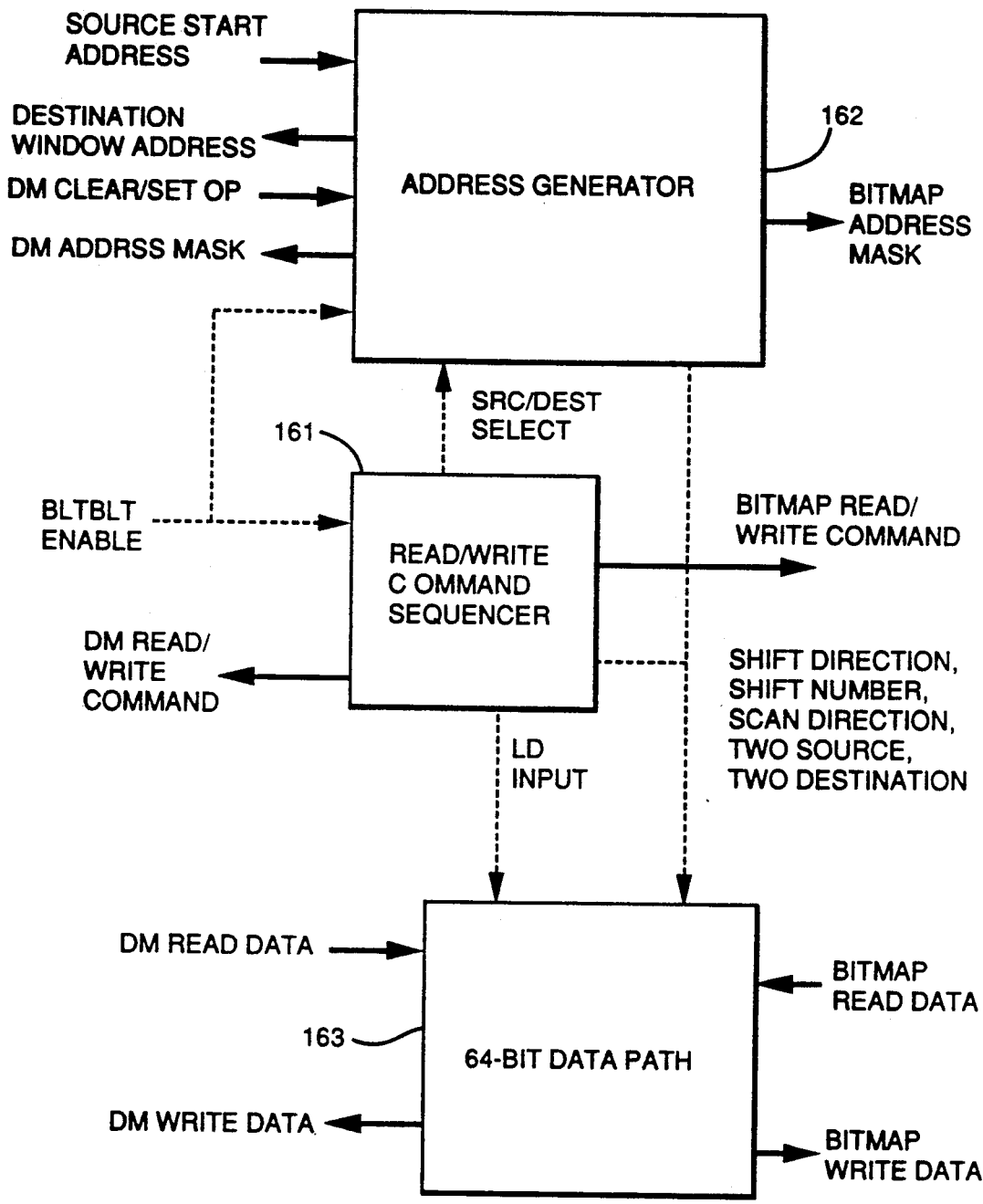
FIG. 13 is a block diagram of the BITBLT address generator of the cogenerator of FIG. 2.

The BITBLT address generator 47 provides a general purpose mechanism for moving rectangular blocks of image data in the bit map memory 22 and the display memory 26. FIG. 13 shows a top level block diagram of the bit boundary block transfer address generator 47 or BITBLT operator 47 of the present invention. As shown, the BITBLT operator 47 comprises three major functional blocks; a read/write command sequencer 161 comprising data manipulation means, an address generator 162, and a 64-bit data path 163. Functionally, the read/write command sequencer 161 generates all requests for external memory cycles to the display memory 26 and the bit mapped memory 22. While a word aligned block transfer may involve only simple READ/WRITE cycles, non-word aligned transfers may involve boundary exceptions and thus require additional cycles to collect or output the necessary data. For example, data from two source words may be required to form the first destination word of each horizontally scanned line. The macrosequence which controls the individual microsequences for each READ and CYCLE control generation then becomes READ/-READ/WRITE. Also, a given situation may require that the data from one source word be read into two destination words and, in this event, the macrosequence becomes READ/WRITE/WRITE. As a practical matter, all permutations of one or two reads and writes are required to support arbitrary bit boundary mappings between source and destination data. To provide this capability, the read/write command sequencer 161 inputs two flags from the address generator 163 that indicate whether two source or two destination words are required for the current macro cycle.

Detailed descriptions of the above-described portions of the cogenerator 10 are given in copending commonly assigned U.S. patent applications Ser. No. 07/582,694, filed on Sep. 14, 1990, entitled, "Dual Programmable Block Texturing and Complex Clipping and Graphics Rendering Processor," Ser. No. 07/582,694, filed on Sep. 14, 1990, entitled "Dual Hardware Channels and Hardware Context Switching in a Graphics Rendering Processor," Ser. No. 07/582,694 filed on Sep. 14, 1990, entitled "Concurrent General Purpose and DMA Processing in a Graphics Rendering Processor," Ser. No. 07/582,694 filed on Sep. 14, 1990, entitled "Integrated Hardware Generator for Area Fill, Conics and Vectors in a Graphics Processor", Ser. No. 07/582,694, filed on Sep. 14, 1990, entitled "Hardware Bit Block Transfer Operator in a Graphics Rendering Processor," Ser. No. 07/582,695, filed on Sep. 14, 1990, entitled "Hardware Symbology and Text Generator in a Graphics Processor," and Ser. No. 07/582,695 filed on Sep. 14, 1990, entitled "Hardware Multiprocess Scheduler in a Graphics Rendering Processor," all by John M. Peaslee and Jeffrey C. Malacarne, whose teachings are incorporated herein by reference.

From the above description it will now be seen that the multifunction cogenerator 10 of the present invention provides a novel and unique system for use in a graphics rendering processor. The multifunction cogenerator 10 includes a plurality of processors for generating graphics primitives, symbols, alphanumerics, and the like, a bit block transfer operator, and a block texturing and complex clip mask processor. All of these functions are synchronously controlled by a multiprocess scheduler. All of these processors are hardware specific thereby providing very high speed performance. Simultaneously, the cogenerator 10 is provided with a large programmable memory, dual channel input buffers, and context registers which enables the cogenerator 10 to be easily externally programmed to perform a wide variety of programmable functions. The cogenerator 10 also provides general purpose programming capability. The cogenerator 10 is also provided with dual channel capability whereby it is able to handle the input of data and programming instructions in parallel with one of the channels being designated a higher priority channel than the other thus enhancing the performance of the cogenerator 10 when used in contraction with high speed graphics systems such as used in military command and control systems and air traffic control systems.

Thus there has been described a new and improved graphics processor capable of performing hardware specific high speed graphics rendering functions as well as general purpose programmable graphics rendering functions. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A multifunction parallel graphics processor for use with a host processor and a graphics display, said multifunction parallel graphics processor comprising:
   interface means for receiving input data and program instructions from the host processor;
   said graphics display including a bit mapped memory;
   block texturing and complex clip mask processor means for generating block texture signal sets and complex clip mask signal sets;
   a graphics generator comprising a plurality of parallel graphics processors for generating a plurality of parallel graphic signal sets, said graphics generator including
      a conics and area fill generating means for generating signal sets for the generation of open and filled conic graphics;
      a symbol and text generator means for generating alpha-numeric graphic symbols;
      a bit block transfer operator means for transferring rectangular blocks of data between the display memory and the bit mapped memory of the graphics display;
      a multiprocess scheduler for synchronously controlling the operation of the transfer operator means, and the block texturing and complex clip mask processor means;
   display memory means for receiving and storing the input data and program instructions from the interface means, the host processor, and the graphics generator;
   context register means coupled to said display memory means for receiving and storing programmable processor attribute signals that determine the graphics generator operating characteristics; and
   display list processor means coupled to the interface means, the display memory, and the graphics generator for controlling the input and output of data, program instructions, and the plurality of parallel graphic signal sets therebetween.

2. A multifunction parallel graphics processor for use with a host processor and a graphics display, said multifunction parallel graphics processor comprising:
   interface means for receiving input data and program instructions from the host processor, said interface means including two operating channels, one of the channels having a higher operating priority than the other channel, and wherein the channels operate in parallel;
   a graphics generator comprising a plurality of parallel graphics processors for generating a plurality of parallel graphic signal sets;
   display memory means for receiving and storing the input data and program instructions from the interface means, the host processor, and the graphics generator, said display memory means including a tri-ported memory having input ports connected to the host processor, the interface means, and the graphics generator;
   context register means coupled to said display memory means for receiving and storing programmable processor attribute signals that determine the graphics generator operating characteristics; and
   display list processor means coupled to the interface means, the display memory, and the processor means for controlling the input and output data, program instructions, and the plurality of parallel graphic signal sets therebetween, said display list processor means including a display memory interface unit coupled between the host processor, the graphics generator, the interface means, and the display memory means; and a readback multiplexer means operatively coupled between the display memory interface unit and a bit mapped memory of the graphics display for transferring data therebetween.

3. A multifunction parallel graphics processor for use with a host processor and a graphics display, said multifunction parallel graphics processor comprising:

interface means for receiving input data and program instructions from the host processor;

a graphics generator comprising a plurality of parallel graphics processors for generating a plurality of parallel graphic signal sets, said graphics generator including two hardware channels with high and low priority, the high priority channel adapted to interrupt operation of the low priority channel and process instructions immediately;

display memory means for receiving and storing the input data and program instructions from the interface means, the host processor, and the graphics generator;

context register means coupled to said display memory means for receiving and storing programmable processor attribute signals that determine the graphics generator operating characteristics; and display list processor means coupled to the interface means, the display memory, and the graphics generator for controlling the input and output of data, program instructions, and the plurality of parallel graphic signal sets therebetween; and context switching means adapted to save a current operational state of the graphics generator, alter the state of the graphics generator, perform a completely independent task, and then restore a previous operating state.

4. The graphics processor of claim 3 wherein nested context switching is accomplished by storing and retrieving a multitude of attribute context register values stored in an attribute stack located in the display memory.

5. The graphics processor of claim 3 that is adapted to perform both general purpose and graphics primitive processing derived from a display list stored in the display memory.

6. A multifunction parallel graphics processor for use with a host processor and a graphics display, said multifunction parallel graphics processor comprising:

interface means for receiving input data and program instructions from the host processor;

said graphics display including a bit mapped memory;

a graphics generator comprising a plurality of parallel graphics processors for generating a plurality of parallel graphic signal sets, said graphics generator including a conics and area fill generating means for generating signal sets for the generation of open and filled conic graphics;

a symbol and text generator means for generating alpha-numeric graphic symbols;

a bit block transfer operator means for transferring rectangular blocks of data between the display memory and the bit mapped memory of the graphics display;

display memory means for receiving and storing the input data and program instructions from the interface means, the host processor, and the graphics context register means coupled to said display memory means for receiving and storing programmable processor attribute signals that determine the graphics generator operating characteristics; and display list processor means coupled to the interface means, the display memory, and the graphics generator for controlling the input and output of data, program instructions, and the plurality of parallel graphic signal sets therebetween; and wherein said bit block transfer operator means is adapted to perform a complete bit block transfer operation between a plurality of source and destination locations and wherein the plurality of source and destination locations includes bit map memory to bit map memory, display memory to bit map memory, bit map memory to display memory, host processor to display memory, display memory to host processor, host processor to bit map memory, and bit map memory to host processor.

7. A multifunction parallel graphics processor for use with a host processor and a graphics display, said multifunction parallel graphics processor comprising:

interface means for receiving input data and program instructions from the host processor;

said graphics display including a bit mapped memory;

block texturing and complex clip mask processor means for generating block texture signal sets and complex clip mask signal sets;

a graphics generator comprising a plurality of parallel graphics processors for generating a plurality of parallel graphic signal sets, said graphics generator including a conics and are fill generating means for generating signal sets for the generation of open and filled conic graphics;

a symbol and text generator means for generating alpha-numeric graphic symbols;

a bit block transfer operator means for transferring rectangular blocks of data between the display memory and the bit mapped memory of the graphics display; and a multiprocess scheduler adapted to control concurrent processes in the graphics generator to allow for simultaneous concurrent operation of the primitive generators comprising the graphics generator and block texturing and complex clipping operations of the block texturing and complex clip mask processor means;

display memory means for receiving and storing the input data and program instructions from the interface means, the host processor, and the graphics generator;

context register means coupled to said display memory means for receiving and storing programmable processor attribute signals that determine the graphics generator operating characteristics; and display list processor means coupled to the interface means, the display memory, and the graphics generator for controlling the input and output of data, program instructions, and the plurality of parallel graphic signal sets therebetween.

* * * * *